June 5, 1934.  C. I. THEEDE  1,961,992
LENS MOUNTING FOR EYEGLASSES
Filed Feb. 18, 1933
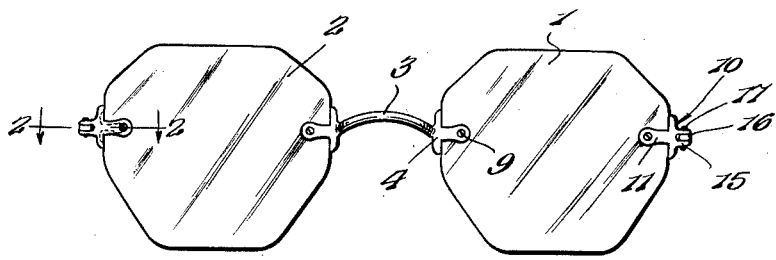
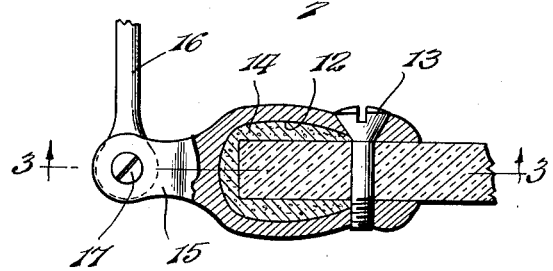
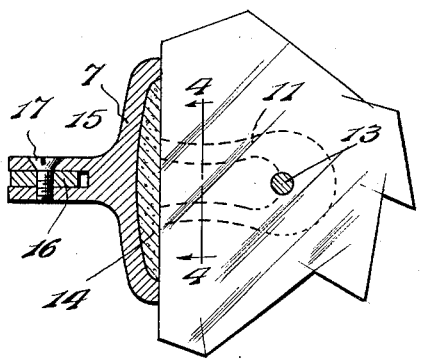
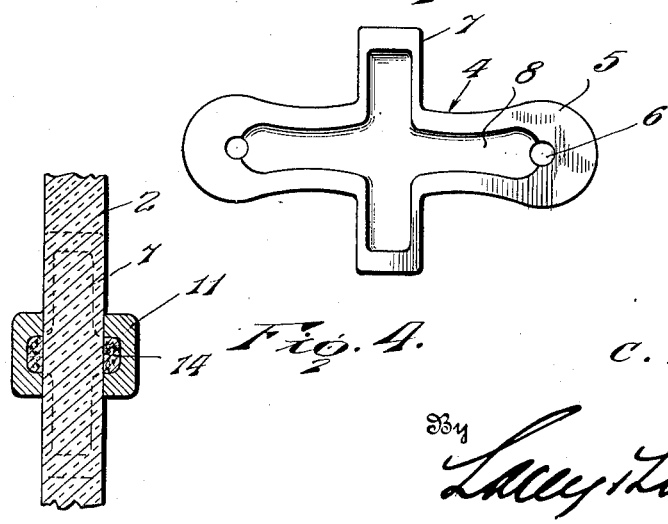
Inventor
C. I. Theede.
By Lacey & Lacey,
Attorneys Patented June 5, 1934

1,961,992

UNITED STATES PATENT OFFICE 1,961,992

LENS MOUNTING FOR EYEGLASSES

Clarence I. Theede, Fremont, Nebr.

Application February 18, 1933, Serial No. 657,411

1 Claim. (Cl. 88—47)

This invention relates to an improved lens mounting more particularly intended for use in conjunction with eyeglasses, and has for its primary object the provision of a device of this character wherein dual means are employed for securing the lenses in proper position in the mounting.

Another object of the invention is to provide a lens mounting for eyeglasses wherein the nose piece, temples, and lenses will be firmly secured in proper cooperative relation without the use of rims about the lenses.

Another object of the invention is to provide a lens mounting for eyeglasses embodying clamps having recesses at their inner surfaces to receive securing cement for locking the lenses and clamps in proper relative position.

A further object of the invention is to provide a lens mounting for eyeglasses wherein the clamps are provided with screws in addition to the cement-receiving recesses so that double insurance against separation of the clamps from the lenses will be afforded.

A still further object of the invention is to provide a lens mounting for eyeglasses wherein the clamps are so formed that cement is permitted to engage three surfaces at the edge of the lens so that said lens will not be permitted to become loose and wobbly.

And a still further object of the invention is to provide a lens mounting for eyeglasses which will be characterized by the utmost simplicity and durability.

Other and incidental objects of the invention will be apparent as the description of the invention proceeds.

In the drawing, Figure 1 is a front elevational view showing a pair of eyeglasses which embody the structure of my invention, Figure 2 is an enlarged fragmentary transverse sectional view on the line 2—2 of Figure 1 looking in the direction indicated by the arrows, Figure 3 is an enlarged fragmentary sectional view taken on the line 3—3 of Figure 2, Figure 4 is an enlarged fragmentary vertical sectional view taken on the line 4—4 of Figure 3, and Figure 5 is an enlarged plan view showing one of the clamps employed before being bent into clamping position.

Referring now more particularly to the drawing, the numerals 1 and 2 indicate a pair of lenses which may be of any desired shape and thickness. Connecting the lenses is a bridge 3 having clamps at its opposite ends, the clamps being indicated in general by the numeral 4. As best seen in Figure 5 of the drawing, the clamps, before being bent into proper clamping position, are substantially cross shaped and are provided with ears 5 which are slightly enlarged and rounded at their free end portions and are provided with apertures 6. The ears 5 are bent into parallel spaced relation with the apertures 6 in alinement to receive the edge of the lens. Extending at right angles to the ears are the bodies of the clamps which are indicated by the numeral 7 and are substantially rectangular in shape.

From a study of Figures 2 and 5 of the drawing, it will be seen that a typical clamp is provided at its inner surface with a recess 8 which leads throughout the major portion of the lengths of the ears 5 and terminates within the apertures 6, medially of their widths, and also the major portion of the length of the body 7. As best seen in Figure 4, the recess is of substantial U-shape in cross section and is adapted to receive cement or shellac therein. It will be understood that, in view of the fact that the ears 5 are provided with the recesses as well as the body 7, when a clamp is in position on a lens, cement will engage two sides and the edge of the lens, and, as best seen in Figure 2 of the drawing, the ears are slightly curved inwardly toward their free end portions so that a relatively large pocket will be defined interiorly of the apertures to receive a large portion of cement. The lens will therefore be firmly anchored in position by the cement. Extending through the alined apertures 6 is a screw 9 which connects the outer end portions of the ears and firmly clamps said ears to the edge of the lens. The screw will provide additional security against breaking of the lens or loosening of the clamp from the lens and in view of the fact that the recesses terminate in the openings, the edge of the lens will be mounted in cement and will not make direct contact with the metal of the clamp, but with the screws.

Mounted on the lenses at their upper edges and disposed oppositely with respect to the clamps 4 of the bridge 3 are clamps which are indicated in general by the numeral 10. The clamps 10 are provided with ears 11 which are of the same construction as the ears 5 and are provided with recesses 12 at their inner surfaces to receive cement in the same manner and for the same purpose as in the case of the clamps 4. Extending through the alined outer end portions of the ears 11 are screws 13 which serve the same function as the screws 9, that is to say, they clamp the lenses between the pairs of ears. Carried in the recesses 12 is cement 14 which corresponds to the cement carried in the recesses 8. The cement is preferably orange flake shellac but, if desired, any other suitable type of cement may be employed. Formed integrally on the clamps 10 are yokes 15 which are adapted to receive the ends of temples 16. The temples are hingedly connected to the yokes by means of screws 17.

It is to be emphasized that, in view of the fact that I have provided all of the clamps, both on the bridge 3 and at the outer edges of the lenses, with recesses, the lenses will be supported in the clamps more effectively for the reason that the cement is permitted to engage three sides of the edges of the lenses. It is to be further emphasized that, as I have provided screws extending through the ears and through the lenses, double insurance against breakage or loosening of the clamps from the lenses is afforded. It is to be further pointed out that should the cement become displaced, the screws will retain the lenses in position and said screws will cooperate with the body portions of the clamps for firmly retaining the lenses and clamps in proper cooperative relation. The body portions of the clamps and the screws will cooperate for effectually bracing the lenses irrespective of the application of the cement although the cement will cooperate with the screws for locking the screws and clamps as a unit.

It will be understood from the foregoing that I have provided a simple and highly efficient lens mounting for eyeglasses.

Having thus described the invention, I claim:

A lens mounting for eyeglasses and spectacles comprising a clamp having a portion constructed to engage the edge of a lens and having a longitudinal pocket in its side presented to the lens, and side arms extending centrally from the opposite edges of the edge-engaging portion to embrace the lens, said arms having longitudinal pockets in their opposed faces merging with the pocket in the edge-engaging portion whereby adhesive supplied to the pockets will be applied against the edge and both faces of a lens in a continuous uninterrupted body, the bottom walls of the pockets in the arms converging toward the ends of the arms and the arms having screw-receiving openings therethrough at the ends of the pockets, the ends of the arms beyond said openings and the ends of the pockets being expanded to bear flat against the faces of the lens.

CLARENCE I. THEEDE. [L. S.]